United States Patent
Decrop et al.

(10) Patent No.: US 11,663,024 B2
(45) Date of Patent: May 30, 2023

(54) EFFICIENT COLLABORATION USING A VIRTUAL ASSISTANT

(71) Applicant: International Business Machines Corporation, Armonk, NY (US)

(72) Inventors: Clement Decrop, Arlington, VA (US); Suman Patra, Kolkata (IN); Spencer Thomas Reynolds, Austin, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/303,739

(22) Filed: Jun. 7, 2021

(65) Prior Publication Data
US 2022/0391233 A1 Dec. 8, 2022

(51) Int. Cl.
| | |
|---|---|
| G06F 9/451 | (2018.01) |
| G06F 3/01 | (2006.01) |
| H04L 65/403 | (2022.01) |
| G10L 15/22 | (2006.01) |
| G10L 15/26 | (2006.01) |

(Continued)

(52) U.S. Cl.
CPC .............. *G06F 9/453* (2018.02); *G10L 15/22* (2013.01); *G10L 15/26* (2013.01); *H04L 65/403* (2013.01); *G06F 3/013* (2013.01); *G06F 3/03543* (2013.01); *G06F 3/167* (2013.01)

(58) Field of Classification Search
CPC .......... G06F 9/453; G06F 3/167; G06F 3/013; G06F 3/03543; G10L 15/22; G10L 15/26; H04L 65/403
See application file for complete search history.

(56) References Cited

U.S. PATENT DOCUMENTS

| | | |
|---|---|---|
| 8,223,186 B2 | 7/2012 | Derocher |
| 9,329,833 B2 | 5/2016 | Swierk |

(Continued)

FOREIGN PATENT DOCUMENTS

| | | | | |
|---|---|---|---|---|
| CN | 102356401 A | * | 2/2012 | ....... G06Q 10/06316 |
| CN | 108292203 A | * | 7/2018 | ......... G06F 16/3329 |

(Continued)

OTHER PUBLICATIONS

How to run this program in Raspberry Pi, retrieved from—https://stackoverflow.com/questions/60505992/how-to-run-this-program-in-raspberry-pi, Mar. 3, 2020, 5 pages (Year: 2020).*

(Continued)

*Primary Examiner* — Yongjia Pan
(74) *Attorney, Agent, or Firm* — Michael O'Keefe (57) ABSTRACT

In an approach to assisting users of a collaborative meeting platform, one or more computer processors detect a start of a collaborative meeting. One or more computer processors monitor one or more activities of the collaborative meeting. Based on the one or more activities of the collaborative meeting, one or more computer processors detect a trigger for assistance with a user interface of the collaborative meeting. One or more computer processors retrieve one or more correlated actions associated with the trigger. One or more computer processors perform at least one of the one or more retrieved correlated action within the user interface of the collaborative meeting.

18 Claims, 3 Drawing Sheets

(51) Int. Cl.
*G06F 3/0354* (2013.01)
*G06F 3/16* (2006.01)

(56) References Cited

U.S. PATENT DOCUMENTS

| | | | | |
|---|---|---|---|---|
| 10,321,096 | B2* | 6/2019 | Morabia | H04N 7/152 |
| 10,367,944 | B2 | 7/2019 | Ishiyama | |
| 10,540,971 | B2 | 1/2020 | Kumar | |
| 10,687,021 | B2 | 6/2020 | Ma | |
| 10,789,041 | B2* | 9/2020 | Kim | G06F 3/165 |
| 10,833,883 | B2 | 11/2020 | Janakiraman | |
| 10,868,684 | B2 | 12/2020 | Jaber | |
| 10,878,809 | B2* | 12/2020 | Gruber | H04M 3/4936 |
| 10,897,368 | B2* | 1/2021 | Mahmoud | H04L 12/1818 |
| 10,944,832 | B2 | 3/2021 | Ezell | |
| 11,100,384 | B2* | 8/2021 | Finkelstein | G06N 5/04 |
| 11,115,226 | B2* | 9/2021 | Wiener | H04L 12/1831 |
| 11,184,560 | B1* | 11/2021 | Mese | G10L 17/00 |
| 2007/0271337 | A1* | 11/2007 | Olson | G06Q 10/10 |
| | | | | 709/204 |
| 2009/0018835 | A1* | 1/2009 | Cooper | G10L 15/26 |
| | | | | 704/E15.045 |
| 2012/0154510 | A1 | 6/2012 | Huitema | |
| 2012/0179502 | A1* | 7/2012 | Farooq | H04L 12/1818 |
| | | | | 705/7.13 |
| 2013/0311924 | A1* | 11/2013 | Denker | G06F 16/332 |
| | | | | 715/771 |
| 2014/0184550 | A1* | 7/2014 | Hennessey | G06F 3/013 |
| | | | | 345/173 |
| 2015/0170652 | A1 | 6/2015 | Kaplan | |
| 2017/0134446 | A1* | 5/2017 | Kitada | G10L 25/57 |
| 2019/0013955 | A1* | 1/2019 | Yoo | H04L 12/1822 |
| 2019/0036856 | A1* | 1/2019 | Bergenlid | H04N 21/4788 |
| 2019/0102054 | A1 | 4/2019 | Pevzner | |
| 2019/0132265 | A1* | 5/2019 | Nowak-Przygodzki | |
| | | | | H04L 65/403 |
| 2019/0189117 | A1* | 6/2019 | Kumar | H04L 51/02 |
| 2019/0221209 | A1* | 7/2019 | Bulpin | G10L 15/08 |
| 2019/0318321 | A1 | 10/2019 | Lopez Venegas | |
| 2019/0392395 | A1 | 12/2019 | Valliani | |
| 2020/0145616 | A1* | 5/2020 | Nassar | G10L 15/07 |
| 2020/0219066 | A1* | 7/2020 | Lin | G06Q 10/1095 |
| 2020/0234696 | A1* | 7/2020 | Vashisht | G10L 15/18 |
| 2020/0320978 | A1 | 10/2020 | Chatterjee | |
| 2020/0327528 | A1 | 10/2020 | Ratcliffe | |
| 2020/0334613 | A1* | 10/2020 | Palazzo | G09B 19/00 |
| 2020/0394057 | A1 | 12/2020 | Dobson | |
| 2021/0021558 | A1* | 1/2021 | Mahmoud | H04L 51/22 |
| 2021/0090568 | A1* | 3/2021 | Bulpin | H04M 3/563 |
| 2021/0314523 | A1* | 10/2021 | Kamisetty | G06F 16/9536 |
| 2021/0359872 | A1* | 11/2021 | Deole | H04R 29/004 |
| 2022/0148591 | A1* | 5/2022 | Chao | G10L 15/22 |

FOREIGN PATENT DOCUMENTS

| | | | | |
|---|---|---|---|---|
| CN | 109559097 | A * | 4/2019 | |
| CN | 110313153 | A * | 10/2019 | A61B 5/0205 |
| CN | 113170076 | A * | 7/2021 | H04L 63/104 |
| DE | 112014000709 | T5 * | 10/2015 | G06F 3/167 |
| JP | 5612068 | B2 * | 10/2014 | G06Q 10/06316 |

OTHER PUBLICATIONS

Take input from tkinter to python script and output from python script to tkinter, retrieved from—https://stackoverflow.com/questions/62155548/take-input-from-tkinter-to-python-script-and-output-from-python-script-to-tkinte, Jun. 2, 2020, 10 pages (Year: 2020).*

Speech Recognition Library Reference, retrieved from—https://github.com/Uberi/speech_recognition/blob/master/reference/library-reference.rst, May 19, 2019, 16 pages (Year: 2019).*

SpeechRecognition 1.3.0, retrieved from—https://pypi.org/project/SpeechRecognition/1.3.0/, Apr. 14, 2015, 15 pages (Year: 2015).*

Bower, Matt, "A Framework for Adaptive Learning Design in a Web-Conferencing Environment", Journal of Interactive Media in Education, 2016, 21 Pages.

Cambre et al., "Firefox Voice: An Open and Extensible Voice Assistant Built Upon the Web", CHI Conference on Human Factors in Computing Systems (CHI '21), May 8-13, 2021, 18 Pages.

Campagna et al., "Almond : The Architecture of an Open, Crowdsourced, Privacy-Preserving Programmable Virtual Assistant", International World Wide Web Conference Committee, WWW 2017, Apr. 3-7, 2017, 10 Pages.

Finnegan, Matthew, "With Spark Assistant, Cisco adds voice-activated A.I. to videoconferencing", Computerworld, Nov. 3, 2017, 6 Pages.

Google, "Use Hey Google voice control in video meetings", Google Meet Hardware, Google LLC, Accessed on Apr. 15, 2021, 2 Pages.

Jiang et al., "Automatic Online Evaluation of Intelligent Assistants", WWW '15: Proceedings of the 24th International Conference on World Wide Web, May 2015, 11 Pages.

Sevilla, Gadjo, "Get Ready: Voice Assistants Are Coming to Your Conference Room", PC Magazine, Apr. 16, 2019, 20 Pages.

Voida et al., "Share and Share Alike: Exploring the User Interface Affordances of File Sharing", Proceedings of the ACM Conference on Human Factors in Computing Systems (CHI 2006), Apr. 22-27, 2006, 10 Pages.

Zoom, "Voice Command with Zoom Rooms", Zoom Video Communications, Inc., Accessed on Apr. 15, 2021, 5 Pages.

* cited by examiner

EFFICIENT COLLABORATION USING A VIRTUAL ASSISTANT

BACKGROUND OF THE INVENTION

The present invention relates generally to the field of natural language processing, and more particularly to efficient collaboration using a virtual assistant.

Natural language processing (NLP) is a field of computer science, artificial intelligence, and linguistics concerned with the interactions between computers and human (natural) languages. As such, natural language processing is related to the area of human—computer interaction. Many challenges in natural language processing involve natural language understanding, that is, enabling computers to derive meaning from human or natural language input.

Web conferencing is used as an umbrella term for various types of online conferencing and collaborative services including webinars ("web seminars"), webcasts, and web meetings. Web conferencing offers data streams of text-based messages, voice, and video chat to be shared simultaneously across geographically dispersed locations. Applications for web conferencing include meetings, training events, lectures, or presentations from a web-connected computer to other web-connected computers. Depending on the technology being used, participants may speak and listen to audio over standard telephone lines or via computer microphones and speakers. Some products allow for use of a webcam to display participants, as well as screen sharing capability for display of content from a participant's computer.

SUMMARY

Embodiments of the present invention disclose a computer-implemented method, a computer program product, and a system for assisting users of a collaborative meeting platform. The computer-implemented method one or more computer processors detecting a start of a collaborative meeting. One or more computer processors monitor one or more activities of the collaborative meeting. Based on the one or more activities of the collaborative meeting, one or more computer processors detect a trigger for assistance with a user interface of the collaborative meeting. One or more computer processors retrieve one or more correlated actions associated with the trigger. One or more computer processors perform at least one of the one or more retrieved correlated action within the user interface of the collaborative meeting.

DETAILED DESCRIPTION

Meetings may be considered one of the most important activities in a business environment. Many organizations hold regular meetings as part of their routine operations. Delivering information, keeping colleagues and customers updated, discussing issues around team projects, assigning tasks, tracking progress, and making decisions are some of the reasons that meetings are an important part of professional activity. Meetings may be held in a variety of manners, including, but not limited to, in person, via teleconference, or via web conference. Web conferences, via a collaborative meeting platform, can be inefficient if one or more of the participants are not familiar with the platform user interface due to software versioning and/or the operating system of the participant. For example, if a participant is asked to share screen content, but does not know how to share via the user interface, there may be a delay in the meeting. The participant may click the wrong buttons, may not see the "share" button, may not have the correct permissions, or may just be confused.

Embodiments of the present invention recognize that efficiency may be gained by providing a system that can easily assist online meeting participants in taking a desired action while reducing the impact and time the participant may take while figuring out how to perform the desired action in the given collaborative platform. Embodiments of the present invention assist a user or participant of a collaborative meeting platform with finding triggers for actions and features to avoid wasting time of the other participants by providing indications within the user interface of the collaborative meeting platform. Embodiments of the present invention invoke a virtual assistant based on interaction via voice of multiple users on multiple devices. Implementation of embodiments of the invention may take a variety of forms, and exemplary implementation details are discussed subsequently with reference to the Figures.

Figure 1:
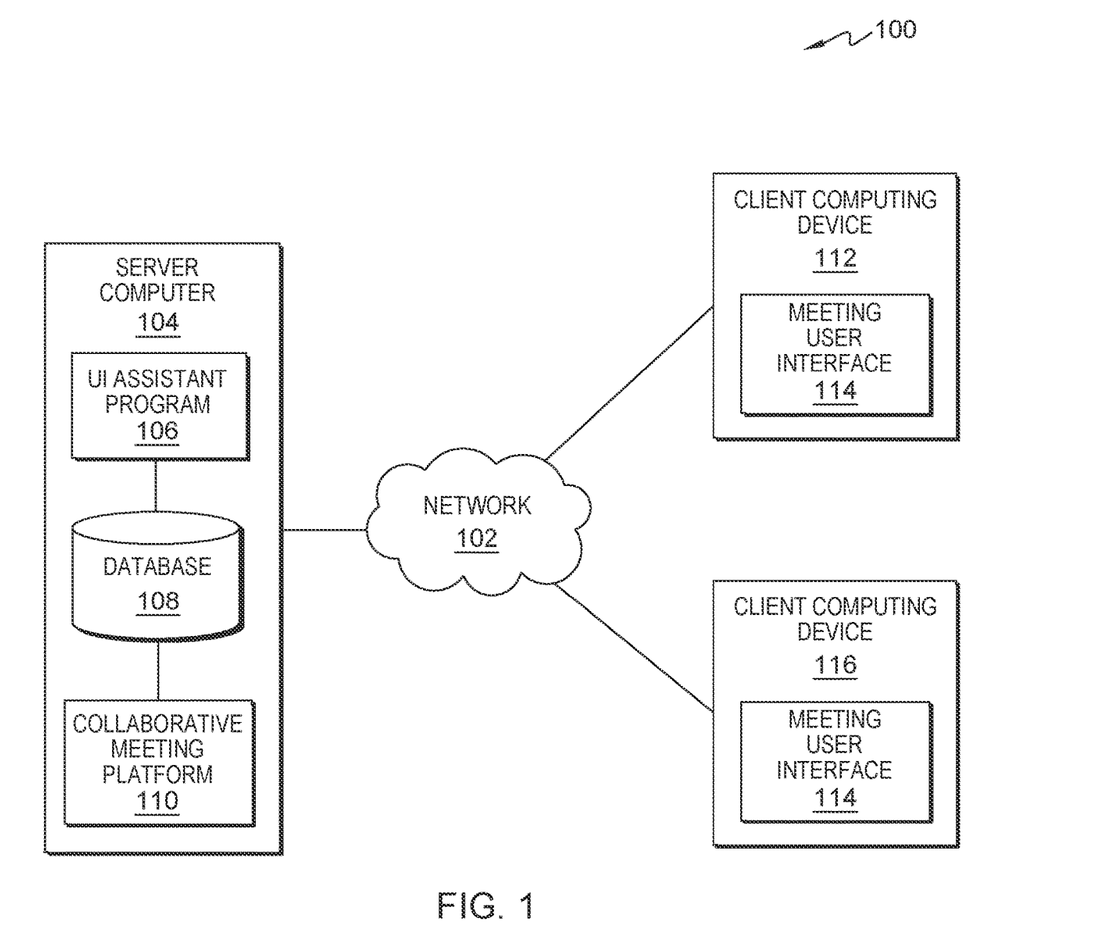
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 112, and client computing device 116 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, client computing device 116, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112, client computing device 116, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes user interface (UI) assistant program 106, database 108, and collaborative meeting platform 110. Server computer 104 may include internal and external hardware components, as depicted and described in further detail with respect to FIG. 3.

User interface (UI) assistant program 106 acts as a conversational, artificial intelligence (AI) powered virtual assistant that can carry out tasks that assist a meeting participant in a more efficient collaboration. UI assistant program 106 executes actions on behalf of a participant in a collaborative meeting based on domain and intent classification, using, for example, NLP, speech processing, dialog management, dialog classification, and question-answering. UI assistant program 106 automatically invokes web conference actions in an online meeting with multiple participants and devices based on the voice of one or more of the participants. UI assistant program 106 detects a collaborative meeting start. UI assistant program 106 retrieves participant information. UI assistant program 106 monitors meeting activities. UI assistant program 106 detects an assistance trigger. UI assistant program 106 retrieves information associated with the assistance trigger. UI assistant program 106 displays a UI assistance indicator. UI assistant program 106 is depicted and described in further detail with respect to FIG. 2.

Database 108 stores information used by and generated by UI assistant program 106. In the depicted embodiment, database 108 resides on server computer 104. In another embodiment, database 108 may reside elsewhere within distributed data processing environment 100, provided that UI assistant program 106 has access to database 108. A database is an organized collection of data. Database 108 can be implemented with any type of storage device capable of storing data and configuration files that can be accessed and utilized by UI assistant program 106, such as a database server, a hard disk drive, or a flash memory. Database 108 stores a historical corpus of trigger words (i.e., words that trigger automated actions) and correlated actions. For example, words and/or phrases such as "mute," "unmute," "screenshare," direct message," "chat," etc., are each linked to a specific action within meeting user interface 114. The historical corpus may also include user intents and/or sentiments associated with the trigger words.

In an embodiment, database 108 stores a neural network model (not shown) used by UI assistant program 106 to determine trigger words and correlated actions. In the embodiment, the neural network model is trained with expected outcomes of trigger words, i.e., audio keywords, as the output nodes and a plurality of speech to text inputs as input nodes. The trained neural network model includes one or more hidden layers. In neural networks, a hidden layer is located between the input and output of the algorithm, in which the function applies weights to the inputs and directs them through an activation function as the output. In short, the hidden layers perform nonlinear transformations of the inputs entered into the network. The usage of hidden layers in this neural network can achieve and significantly increase accuracy. For example, a hidden layer can process screenshare actions to determine user actions indicative of cursor movement toward a specific button. In an embodiment, the neural network model is also trained using one or more hyperparameters, i.e., influencing variables, that act as additional hidden layer related entities. In an embodiment, the neural network model is a function included in UI assistant program 106.

Database 108 also stores user profiles submitted by meeting participants, such as the user of client computing device 112 and the user of client computing device 116, via meeting user interface 114. The user profiles may include, but are not limited to, the name of the user, an address, an email address, a voice sample, a phone number, a credit card number, an account number, an employer, a job role, a job family, a business unit association, a job seniority, a job level, a resume, a medical record, a social network affiliation, etc. The user profile may also include user preferences, such as defaults for collaborative meeting platform 110, for example, whether to initially mute the microphone associated with client computing device 112 or whether to initially keep a camera associated with client computing device 112 turned off. In addition, database 108 may store a company directory that lists, for example, employees, job titles, and office locations.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. UI assistant program 106 enables the authorized and secure processing of personal data. UI assistant program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. UI assistant program 106 provides information regarding personal data and the nature (e.g., type, scope, purpose, duration, etc.) of the processing. UI assistant program 106 provides the user with copies of stored personal data. UI assistant program 106 allows the correction or completion of incorrect or incomplete personal data. UI assistant program 106 allows the immediate deletion of personal data.

Collaborative meeting platform 110 is one of a plurality of available software packages or online services with which users can hold live meetings, conferencing, presentations, and training via the Internet, particularly on TCP/IP connections. Collaborative meeting platform 110 may also be known as online meeting software or, sometimes, simply video conferencing. Collaborative meeting platform 110 enables remote meetings based on Voice over Internet Protocol (VoIP), online video, instant messaging, file sharing, and screen sharing.

Client computing device 112 and client computing device 116 can each be one or more of a laptop computer, a tablet computer, a smart phone, smart watch, a smart speaker, or any programmable electronic device capable of communicating with various components and devices within distributed data processing environment 100, via network 102. Client computing device 112 and client computing device 116 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 and client computing device 116 may each be integrated into a vehicle of the user. For example, client computing device 112 and client computing device 116 may each include a heads-up display in the windshield of the vehicle. In general, client computing device 112 and client computing device 116 each represents one or more programmable electronic devices or combination of programmable electronic devices capable of executing machine readable program instructions and communicating with other computing devices (not shown) within distributed data processing environment 100 via a network, such as network 102. Client computing device 112 and client computing device 116 each include an instance of meeting user interface 114.

Meeting user interface 114 provides an interface between collaborative meeting platform 110 on server computer 104 and a user of client computing device 112 and/or a user of client computing device 116. In one embodiment, meeting user interface 114 is mobile application software. Mobile application software, or an "app," is a computer program designed to run on smart phones, tablet computers and other mobile devices. In one embodiment, meeting user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Meeting user interface 114 enables a user of client computing device 112 and/or a user of client computing device 116 to participate in meetings held using collaborative meeting platform 110. Meeting user interface 114 enables a user of client computing device 112 and/or a user of client computing device 116 to complete a user profile and store the profile in database 108. UI assistant program 106 interacts with and uses meeting user interface 114 to assist participants in a collaborative meeting.

Figure 2:
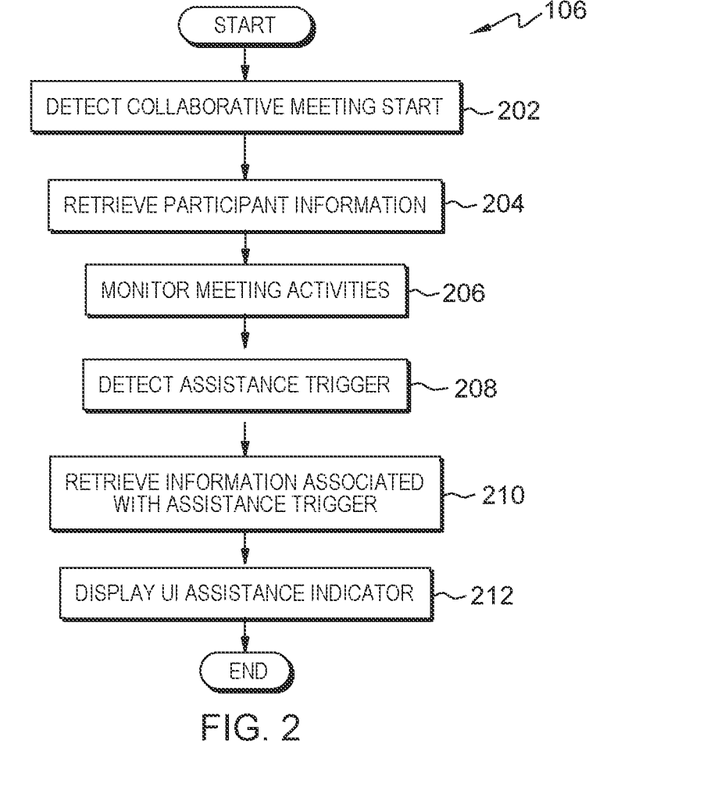
FIG. 2 is a flowchart depicting operational steps of a user interface assistant program, on a server computer within the distributed data processing environment of FIG. 1, for assisting users of a collaborative meeting platform, in accordance with an embodiment of the present invention.

FIG. 2 is a flowchart depicting operational steps of UI assistant program 106, on server computer 104 within distributed data processing environment 100 of FIG. 1, for assisting users of collaborative meeting platform 110, in accordance with an embodiment of the present invention.

UI assistant program 106 detects a collaborative meeting start (step 202). In an embodiment, when a user of client computing device 112 or client computing device 116 initiates a web conference meeting on collaborative meeting platform 110, via meeting user interface 114, UI assistant program 106 detects the meeting initiation. In one embodiment, UI assistant program 106 may detect a meeting participant clicking on a link in meeting user interface 114 to initiate the collaborative meeting. In another embodiment, UI assistant program 106 may detect a participant sending a meeting notice, through collaborative meeting platform 110, an email application (not shown), or a calendaring application (not shown). In another embodiment, UI assistant program 106 may detect a collaborative meeting start when a participant uploads a meeting agenda to collaborative meeting platform 110.

UI assistant program 106 retrieves participant information (step 204). In an embodiment, UI assistant program 106 retrieves information pertaining to the meeting invitees and/or participants. In one embodiment, UI assistant program 106 retrieves meeting information from database 108. In the embodiment, UI assistant program 106 retrieves information associated with the participants of the web conference. For example, UI assistant program 106 may retrieve a participant's name, address, phone number, email address, social network affiliation, employer name, resume, job title, job role, and any other information which may be relevant to the meeting. In an embodiment, UI assistant program 106 retrieves information associated with the current participants of the collaborative meeting. In an embodiment, UI assistant program 106 also retrieves information specific to the meeting from one or more applications. For example, UI assistant program 106 may retrieve the meeting title, agenda, list of invitees, date, time, and duration from the meeting notice in a calendaring application (not shown). In another example, UI assistant program 106 may retrieve data from a conversation between two or more participants about the meeting in an instant messaging application (not shown). In a further example, UI assistant program 106 may retrieve invitees' responses to the meeting notice from an email application (not shown).

UI assistant program 106 monitors meeting activities (step 206). In an embodiment, UI assistant program 106 monitors the audio inputs of the meeting and indexes spoken content from one or more participants. In an embodiment, UI assistant program 106 uses one or more natural language processing (NLP) techniques to transform speech into text. In an embodiment, UI assistant program 106 recognizes and associates the voice of a speaker with a participant of the meeting based on the retrieved participant information. In another embodiment, UI assistant program 106 monitors for the name of a participant spoken by another participant. For example, a participant may state, "Walter, please share your screen," and UI assistant program 106 determines that Walter is a participant in the meeting. In an embodiment, UI assistant program 106 monitors data from other input methods via software and/or hardware. For example, UI assistant program 106 may capture eye gaze information from a camera associated with client computing device 112 and/or client computing device 116. In another example, UI assistant program 106 may monitor inputs from mouse clicks or finger taps on a display screen associated with client computing device 112 and/or client computing device 116.

UI assistant program 106 detects an assistance trigger (step 208). In an embodiment, based on monitoring the collaborative meeting activities, UI assistant program 106 detects a trigger for assistance with meeting user interface 114, i.e., an indication that a participant is in need of assistance with meeting user interface 114. In an embodiment, UI assistant program 106 detects an assistance trigger based on received audio input. For example, a participant may say "I can't find the screenshare button." UI assistant program 106 detects a trigger word stored in database 108, such as screenshare, and, using one or more NLP techniques, determines a participant needs assistance finding the screenshare button in meeting user interface 114. In an embodiment where the external microphone associated with client computing device 112 is muted, UI assistant program 106 still receives audio input from the user of client computing device 112 if the user speaks a trigger word out loud. In another example, UI assistant program 106 may detect an assistance trigger based on one participant speaking to another participant, such as when a participant says "Zach, please mute your microphone." UI assistant program 106 detects the trigger word "mute" and determines that participant Zach may need assistance finding the mute button. In an embodiment, UI assistant program 106 may detect an assistance trigger after a period of time has passed since UI assistant program 106 detected a trigger word. For example, UI assistant program 106 detects the audio input of "Zach, please mute your microphone," and a maximum time threshold, such as 30 seconds, is met before Zach's microphone is muted. In an embodiment, UI assistant program 106 detects an assistance trigger by monitoring a participant's eye gaze after detecting a trigger word. For example, UI assistant program 106 detects the audio input of "Zach, please mute your microphone," and determines that Zach's eye gaze is moving rapidly around his screen, indicating that Zach is looking for the mute button. In an embodiment, UI assistant program 106 detects an assistance trigger by monitoring movement of a participant's mouse. For example, UI assistant program 106 detects the audio input of "let me check the chat," then UI assistant program 106 detects the participant moves the mouse away from the chat button. UI assistant program 106 determines the participant cannot find the chat button, thus, detecting an assistance trigger. In an embodiment, UI assistant program 106 detects an assistance trigger when a participant asks either UI assistant program 106 or another participant for assistance with meeting user interface 114. For example, a user may ask "where do I find the chat button?" and UI assistant program 106 detects an assistance trigger.

UI assistant program 106 retrieves information associated with the assistance trigger (step 210). In an embodiment, based on the detected assistance trigger, UI assistant program 106 retrieves one or more correlated actions associated with the trigger from the historical corpus in database 108. For example, if the assistance trigger is a participant saying, "I can't find the screenshare button," then UI assistant program 106 retrieves actions associated with the screenshare button from the historical corpus. An action associated with the trigger word "screenshare button" may be, for example, displaying a flashing arrow that points to the screenshare button within meeting user interface 114. In an embodiment, UI assistant program 106 identifies the participant that needs assistance by correlating the speech to text analysis with the names of the participants in the collaborative meeting. For example, if the assistance trigger is a participant saying "Zach, please mute your microphone," then UI assistant program 106 retrieves information associated with the participants of the collaborative meeting from database 108 and identifies Zach as the participant in need of assistance with the location of the mute button. In general, using intent classification, UI assistant program 106 identifies the specific intent of the participant within the meeting domain concept by extracting the intent associated with a given action from the historical corpus.

UI assistant program 106 displays a UI assistance indicator (step 212). In an embodiment, UI assistant program 106 performs one or more of the retrieved correlated actions. In an embodiment, UI assistant program 106 displays an indicator of an assistance action in meeting user interface 114. The assistance indicator may be a shortcut link, a hotkey, an interactive pop-up, a text message, an arrow pointing to a feature associated with the trigger word, etc. Continuing the previous example, after UI assistant program 106 retrieves an action associated with the trigger word "screenshare button," then UI assistant program 106 displays a flashing arrow that points to the screenshare button within meeting user interface 114. In another embodiment, in addition to, or instead of, displaying a UI assistance indicator in meeting user interface 114, UI assistant program 106 performs the action. For example, in response to detecting a participant saying "Zach, please mute your microphone," UI assistant program 106 interacts with meeting user interface 114 to mute the microphone of participant Zach. In an embodiment, UI assistant program 106 displays a tutorial and/or amelioration steps to the participant, such that, in the event of the participant's failure to take action or unavailability of a button, UI assistant program 106 presents reasoning for the situation, i.e., UI assistant program 106 gives the user a reason for the user's difficulty with the action based on the cause of the difficulty. For example, if the participant states, "I'm trying to share my screen, but it's not working," then UI assistant program 106, after determining the cause of the problem based on the context, displays a message, via meeting user interface 114, that states, "You are not a presenter. Please ask the host for presenter permission." In another example, in a similar scenario, UI assistant program 106 may display a message directly to the host of the collaborative meeting, via meeting user interface 114, explaining that the host has to pass the presenter permission to the other participant. In an example where UI assistant program 106 detects the audio input of "let me check the chat," and then detects that the participant moves the mouse away from the chat button, UI assistant program 106 displays a message, via meeting user interface 114, stating "Please click the speech bubble button at the top left of the screen." In yet another example, if UI assistant program 106 determines a participant is trying to unmute the microphone to ask a question, but unmuting is constrained by collaborative meeting platform 110, then UI assistant program 106 can automatically move the cursor of the participant to a question and answer section of the screen to assist the participant in posting a question. In a further example, if UI assistant program 106 detects an audio assistance trigger of a participant asking, "Is Spencer on the call?" then UI assistant program 106 can interact with meeting user interface 114 to display an image of Spencer based on the retrieved participant information.

In an example use case of UI assistant program 106, a collaborative meeting participant, Walter, is invited to present to employees of another organization about his recent work. The organization uses a collaborative meeting platform, such as collaborative meeting platform 110, with which Walter is not familiar. As Walter begins speaking, he attempts to share his screen to provide supporting evidence and visualizations. Walter states, "I can't find the share button." UI assistant program 106 detects an assistance trigger within Walter's statement, and retrieves an associated assistance action from the historical corpus in database 108. UI assistant program 106 either displays an assistance indicator by highlighting the share button in meeting user interface 114 or triggers the screen share on Walter's behalf.

In another version of the previous example use case of UI assistant program 106, a participant of the collaborative meeting notices Walter struggling to share his screen, so the participant unmutes and states, "Walter, the share button is in the bottom left of the screen." UI assistant program 106 detects an assistance trigger directed to Walter, such that UI assistant program 106 can perform a correlated action on Walter's device, even though Walter himself did not trigger the need for assistance.

Figure 3:
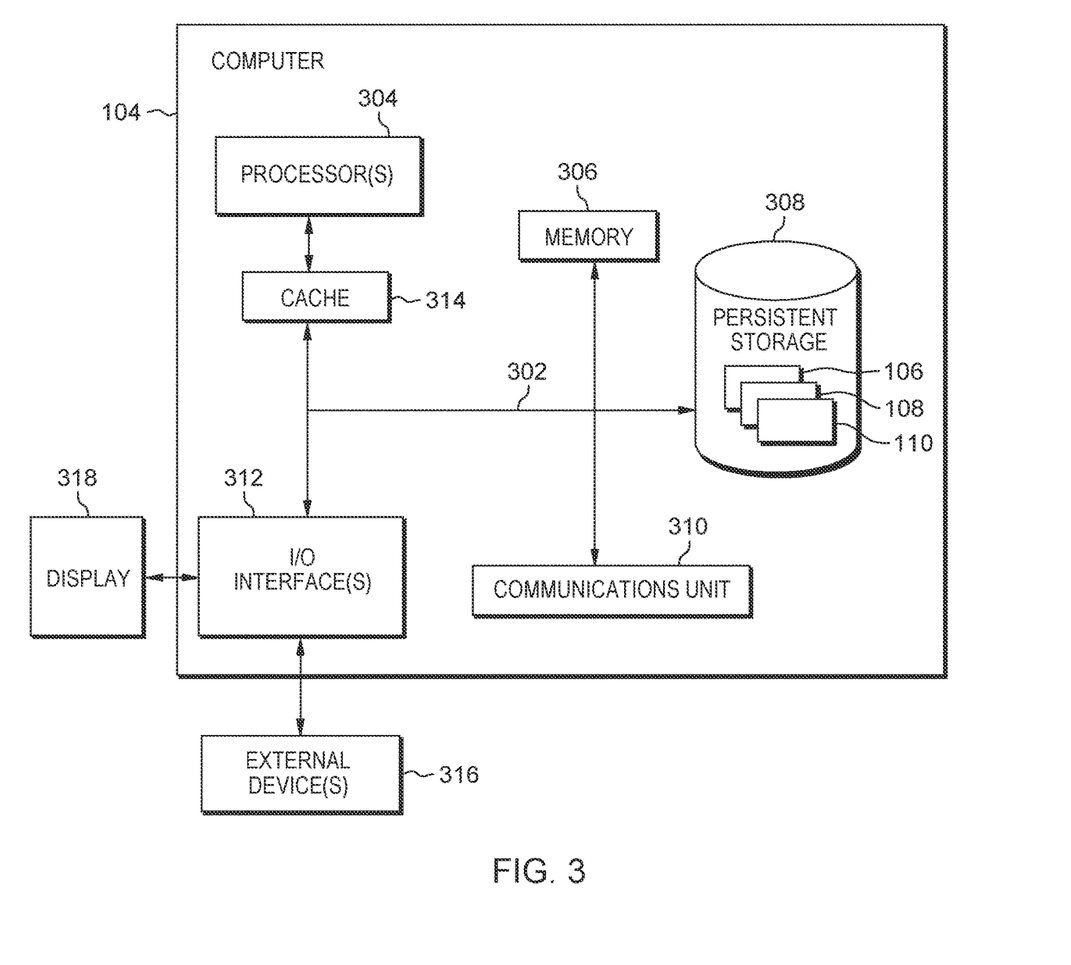
FIG. 3 depicts a block diagram of components of the server computer executing the user interface assistant program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., UI assistant program 106, database 108, and collaborative meeting platform 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 112 and client computing device 116. In these examples, communications unit 310 includes one or more network interface cards. Communications unit 310 may provide communications through the use of either or both physical and wireless communications links. UI assistant program 106, database 108, collaborative meeting platform 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., UI assistant program 106, database 108, and collaborative meeting platform 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   detecting, by one or more computer processors, a user of a collaborative meeting platform uploading a meeting agenda to initiate a collaborative meeting;
   monitoring, by one or more computer processors, a first participant, a second participant and one or more activities of the collaborative meeting for a trigger, wherein the trigger is a name of a first participant spoken by a second participant;
   detecting, by one or more computer processors, an assistance trigger for a user interface of the collaborative meeting by the first participant;
   retrieving, by one or more computer processors, from a historical corpus, one or more actions correlated with the assistance trigger;
   determining, by one or more computer processors, a period of time has passed since detecting the assistance trigger;
   determining, by one or more computer processors, the period of time exceeds a maximum time threshold; and
   responsive to determining the period of time exceeds a maximum time threshold, performing, by one or more computer processors, at least one of the one or more retrieved correlated actions within the user interface of the collaborative meeting.

2. The computer-implemented method of claim 1, further comprising:

retrieving, by one or more computer processors, information associated with one or more participants of the collaborative meeting.

3. The computer-implemented method of claim 2, further comprising:
based on the retrieved information associated with the one or more participants of the collaborative meeting, associating, by one or more computer processors, a name of a speaker with a participant of the collaborative meeting.

4. The computer-implemented method of claim 2, wherein the information associated with the one or more participants of the collaborative meeting include at least one of: a user profile, a name, an address, an email address, a voice sample, a phone number, a credit card number, an account number, an employer, a job role, a job family, a business unit association, a job seniority, a job level, a resume, a medical record, a social network affiliation, one or more user preferences, and one or more defaults for the collaborative meeting platform.

5. The computer-implemented method of claim 1, wherein detecting the trigger for assistance with the user interface of the collaborative meeting includes at least one of: receiving audio input, detecting eye gaze movement, and detecting mouse movement.

6. The computer-implemented method of claim 1, wherein performing the at least one of the one or more retrieved correlated actions within the user interface of the collaborative meeting further comprises:
displaying, by one or more computer processors, at least one of a shortcut link, a hotkey, an interactive pop-up, a text message, and an arrow pointing to a feature associated with a trigger word.

7. A computer program product comprising:
one or more computer readable storage media and program instructions collectively stored on the one or more computer readable storage media, the stored program instructions comprising:
program instructions to detect a user of a collaborative meeting platform uploading a meeting agenda to initiate a collaborative meeting;
program instructions to monitor a first participant, a second participant and one or more activities of the collaborative meeting for a trigger, wherein the trigger is a name of a first participant spoken by a second participant;
program instructions to detect an assistance trigger for a user interface of the collaborative meeting by the first participant;
program instructions to retrieve, from a historical corpus, one or more actions correlated with the assistance trigger;
program instructions to determine a period of time has passed since detecting the assistance trigger;
program instructions to determine the period of time exceeds a maximum time threshold; and
responsive to determining the period of time exceeds a maximum time threshold, program instructions to perform at least one of the one or more retrieved correlated actions within the user interface of the collaborative meeting.

8. The computer program product of claim 7, the stored program instructions further comprising:
program instructions to retrieve information associated with one or more participants of the collaborative meeting.

9. The computer program product of claim 8, the stored program instructions further comprising:
based on the retrieved information associated with the one or more participants of the collaborative meeting, program instructions to associate a name of a speaker with a participant of the collaborative meeting.

10. The computer program product of claim 8, wherein the information associated with the one or more participants of the collaborative meeting include at least one of: a user profile, a name, an address, an email address, a voice sample, a phone number, a credit card number, an account number, an employer, a job role, a job family, a business unit association, a job seniority, a job level, a resume, a medical record, a social network affiliation, one or more user preferences, and one or more defaults for the collaborative meeting platform.

11. The computer program product of claim 7, wherein the program instructions to detect the trigger for assistance with the user interface of the collaborative meeting includes at least one of: receiving audio input, detecting eye gaze movement, and detecting mouse movement.

12. The computer program product of claim 7, wherein the program instructions to perform the at least one of the one or more retrieved correlated actions within the user interface of the collaborative meeting comprises:
program instructions to display at least one of a shortcut link, a hotkey, an interactive pop-up, a text message, and an arrow pointing to a feature associated with a trigger word.

13. A computer system comprising:
one or more computer processors;
one or more computer readable storage media;
program instructions collectively stored on the one or more computer readable storage media for execution by at least one of the one or more computer processors, the stored program instructions comprising:
program instructions to detect a user of a collaborative meeting platform uploading a meeting agenda to initiate a collaborative meeting;
program instructions to monitor a first participant, a second participant and one or more activities of the collaborative meeting for a trigger, wherein the trigger is a name of a first participant spoken by a second participant;
program instructions to detect an assistance trigger for a user interface of the collaborative meeting by the first participant;
program instructions to retrieve, from a historical corpus, one or more actions correlated with the assistance trigger;
program instructions to determine a period of time has passed since detecting the assistance trigger;
program instructions to determine the period of time exceeds a maximum time threshold; and
responsive to determining the period of time exceeds a maximum time threshold, program instructions to perform at least one of the one or more retrieved correlated actions within the user interface of the collaborative meeting.

14. The computer system of claim 13, the stored program instructions further comprising:
program instructions to retrieve information associated with one or more participants of the collaborative meeting.

15. The computer system of claim 14, the stored program instructions further comprising:

based on the retrieved information associated with the one or more participants of the collaborative meeting, program instructions to associate a name of a speaker with a participant of the collaborative meeting.

16. The computer system of claim 14, wherein the information associated with the one or more participants of the collaborative meeting include at least one of: a user profile, a name, an address, an email address, a voice sample, a phone number, a credit card number, an account number, an employer, a job role, a job family, a business unit association, a job seniority, a job level, a resume, a medical record, a social network affiliation, one or more user preferences, and one or more defaults for the collaborative meeting platform.

17. The computer system of claim 13, wherein the program instructions to detect the trigger for assistance with the user interface of the collaborative meeting includes at least one of: receiving audio input, detecting eye gaze movement, and detecting mouse movement.

18. The computer system of claim 13, wherein the program instructions to perform the at least one of the one or more retrieved correlated actions within the user interface of the collaborative meeting comprises:
program instructions to display at least one of a shortcut link, a hotkey, an interactive pop-up, a text message, and an arrow pointing to a feature associated with a trigger word.

* * * * *